Aug. 24, 1965     W. K. HEINTZ     3,202,003
FRICTION DISC DRIVE
Filed April 4, 1963

INVENTOR:
WALTER K. HEINTZ
BY
ATTORNEYS.

United States Patent Office 3,202,003
Patented Aug. 24, 1965

3,202,003
FRICTION DISC DRIVE
Walter K. Heintz, Westfield, N.J., assignor to Ford Motor Company, Dearborn, Mich., a corporation of Delaware
Filed Apr. 4, 1963, Ser. No. 270,672
5 Claims. (Cl. 74—199)

My invention relates generally to friction disc drives, and more particularly, to friction disc drives having infinitely variable speed ratio characteristics.

My invention is adapted especially to be used in a disc drive arrangement having power input discs disposed concentrically within power output ring discs, and wherein so-called carrier discs are employed for establishing a driving connection between the power input discs and the power output discs. The carrier discs may be mounted upon carrier structure that may be moved radially with respect to the common axis of the power input discs and the power output discs to establish infinitely variable speed ratios.

A single pair of power input discs, a single pair of power output discs and a single carrier disc could be employed, but the capacity of the mechanism would be reduced. If a plurality of carrier discs and several pairs of power input discs and power output discs are employed, the carrier discs must be capable of accommodating a slight degree of angular tilting or relative misalignment as the carrier is moved from one radial position to another. This is due to the fact that the carrier discs normally are formed with a so-called conical shape with the transverse dimension at the hub portion of the carrier disc being greater than the transverse dimension of the rim portion. For example, if the carrier is moved to a low speed ratio position, the power input discs tend to move toward each other, but the power output discs tend to move farther apart. The converse is true upon movement of the carrier to a high speed ratio position. Because of this misalignment problem, it is common practice to form the carrier discs in two groups that are secured to a common carrier shaft. Thus, the carrier discs of one group can move to accommodate corresponding axial movement of the power input discs while the other carrier disc group may satisfy the axial shifting requirements of the power output discs. The necessity for using two groups of carrier discs increases the space requirements of the mechanism and this sometimes imposes limitations upon the uses of the mechanism.

It is common practice also to apply a clamping force to the engageable discs by means of a clamping spring. Since the clamping spring force must be sufficient to accommodate the most extreme loads, the clamping loads that are obtained during operation of the mechanism under reduced torque are in excess of that which is needed.

The improvements of my invention eliminate the foregoing shortcomings. I have provided a means for establishing a driving connection between the driving power input discs and the driven power output discs by means of a carrier disc assembly without the need for grouping the discs of the carrier disc assembly in two pairs. I have done this while avoiding the undesirable misalignment problem.

According to another feature of my invention, I have provided a means for loading the relatively engageable friction discs hydraulically. The magnitude of the pressure force that may be applied to the contact surfaces of the discs can be varied depending upon the torque transmitting requirements of the mechanism. Thus, the optimum loading of the contact areas is achieved at all times.

The provision of an improved disc drive mechanism of the type above set forth being an object of my invention, it is a further object of my invention to provide a disc drive having concentric power input and power output discs wherein each of the discs defines its own pressure chamber. Each chamber is adapted to be loaded hydraulically to accommodate the necessary axial shifting movement of the discs due to changes in the radial position of the cooperating carrier disc assembly.

It is a further object of my invention to provide a disc drive of the type above set forth wherein the pressure chambers defined by the power output discs are isolated from the pressure chambers defined by the power input discs so that each may be loaded with a pressure that is sufficient to establish the desired contact forces.

Further objects and features of my invention will become apparent from the following description and from the accompanying drawings wherein.

Figure 1:
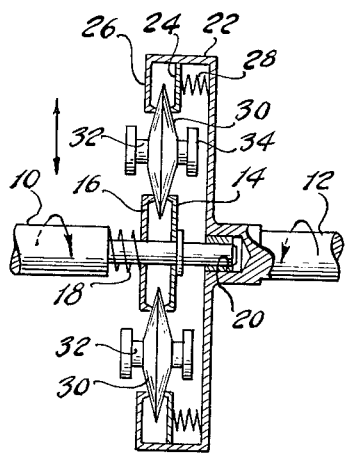
FIGURE 1 shows an example of a prior art friction drive employing a single pair of power input discs, a single pair of power output discs and a single set of carrier discs.

Referring first to FIGURE 1, I have shown in schematic form a conventional prior art construction having a power input shaft 10 and a power output shaft 12. Splined to the power input shaft 10 is a pair of sun discs 14 and 16. A splined connection between shaft 10 and discs 14 and 16 will permit axial shifting movement of the discs to occur although relative rotation of these discs with respect to shaft 10 is inhibited. A clamping force can be applied to the discs 14 and 16 by means of a spring 18.

Shaft 10 can be piloted within a pilot opening 20 in shaft 12. This opening 20 is located in the hub of a power output drum 22 that carries ring discs 24 and 26. These discs also are spring loaded into clamping engagement, suitable springs 28 being provided for this purpose.

Disposed between the power input discs and the power output discs are carrier discs 30 of conical form. These discs are carried by disc carrier shafts 32. These shafts may be moved radially inwardly or radially outwardly as indicated by the arrows. They are journaled in bearing blocks, one of which is designated by reference character 34.

It is apparent that shaft 10 will be capable of driving shaft 12 at a reduced speed ratio. If the carrier discs 30 are moved radially outwardly, the speed ratio will decrease. Conversely, if the carrier discs are moved radially inwardly, the speed ratio will increase. The springs 18 and 28 establish the neecssary frictional connection between the carrier discs and the driving and driven discs.

Figure 2:
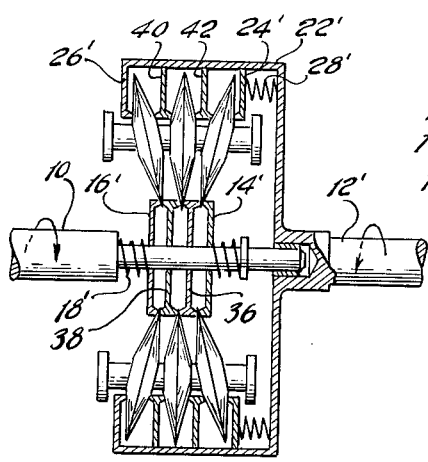
FIGURE 2 shows a construction similar to that of FIGURE 1 although a plurality of ring discs, power input discs and carrier discs are provided.

The device of FIGURE 1, since it employs a single disc, necessarily is of a reduced capacity. To increase its capacity the number of carrier discs can be increased as indicated in FIGURE 2. For purposes of clarity, the parts of the structure of FIGURE 2 that have counterparts in FIGURE 1 have been indicated by similar reference characters although primed notations have been added. The carrier discs of FIGURE 2, like the carrier discs of FIGURE 1, are conical in form. Thus, as the carrier is moved radially outwardly, the driving discs 14' and 16' become misaligned.

In addition to the discs 14' and 16', two other power input discs are provided as indicated at 36 and 38. In a similar fashion, power output discs 40 and 42 are provided in addition to power output discs 24' and 26'.

It will be observed from an inspection of FIGURE 2 that as the carrier discs are moved radially outwardly, the power output discs move apart and the power input discs move together. This produces a tilting action of the carrier discs which undesirably increases the degree of friction at the contact surfaces and reduces the torque transmitting capacity of the unit. Also, a considerable amount of friction between the carrier discs and the carrier discs supporting shafts is introduced.

Figure 3:
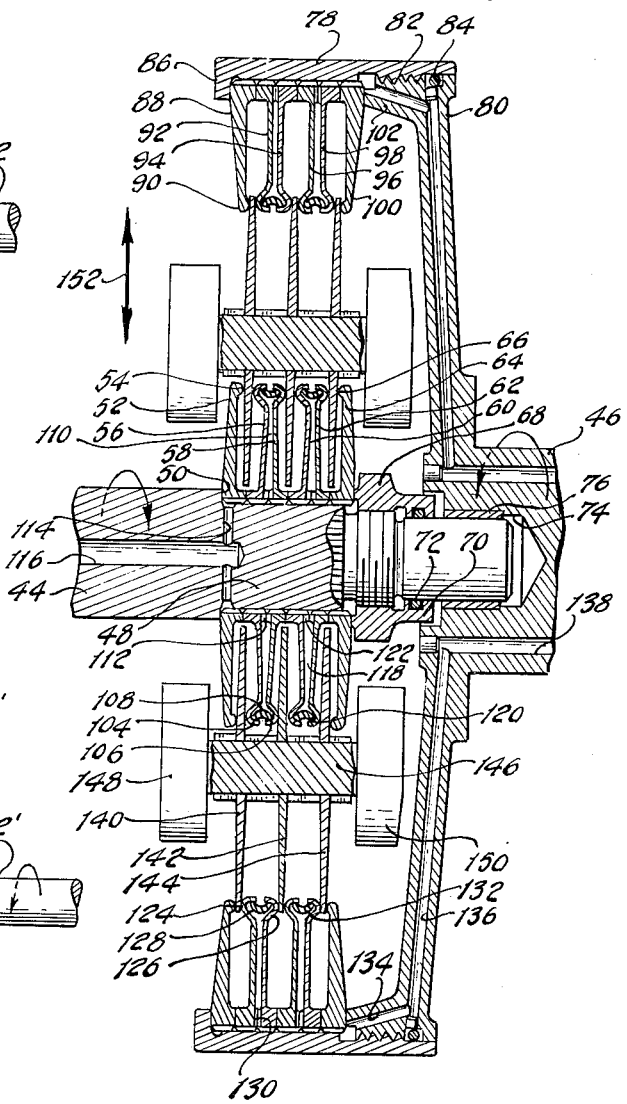
FIGURE 3 shows my improved construction in cross sectional form.

Referring next to my improved construction of FIGURE 3, a driving shaft is indicated generally by reference character 44 and a driven shaft is shown at 46. Shaft 44 is formed with a reduced diameter externally splined portion 48 and a shoulder 50 is situated at the region of the change in diameter. Disposed adjacent shoulder 50 is a first driving disc 52 driving a rim portion 54 of circular dimensions when viewed in cross section.

The hub of disc 52 is internally splined to establish a driving connection with the externally splined shaft portion 48.

Disposed adjacent disc 52 is a second driving disc formed in two parts that are identified separately by reference numerals 56 and 58. Each disc part 56 and 58 includes a hub that is internally splined to the shaft portion 48. The hub of disc part 56 is disposed in sealing engagement with the hub 50 of disc 52. Similarly, the hub of disc part 58 sealingly engages the hub of disc part 56.

Another bipartite driving disc is disposed adjacent disc part 58. The separate parts of this other disc are identified by reference characters 60 and 62. The hub of disc part 60 sealingly engages the hub of disc part 58 and the hub of disc part 62 sealingly engages the hub of disc part 60.

The hub of a final driving disc is shown at 64. This disc may be substantially a mirror image of disc 52. It includes an internally splined hub that sealingly engages the disc part 62. It is formed also with a rim portion 66 of circular cross section as indicated.

A clamping nut 68 threaded upon the end of shaft 44 maintains the hubs of the driving discs in clamped sealing engagement. An extension 70 of the nut 68 is formed with an internal sealing groove within which is situated a sealing O-ring 72.

The right-hand end of shaft 44 is formed of reduced diameter and is received within a pilot opening 74 in shaft 46. The shaft 44 is journaled within this opening by means of bushing 76.

A disc drum is indicated by reference character 78. It is threadably connected to the periphery of a circular drive plate 80, suitable threaded portions 82 being provided for this purpose. An annular groove 84 also is formed on the periphery of plate 80 and an O-ring is situated therein to establish a fluid seal between the drum 78 and the plate 80.

Drum 78 is formed with an end reaction shoulder 86. It is formed also with internal splines to establish a splined driving connection with a series of driven discs, the first of which is designated by reference character 88. This disc is formed with an externally splined hub and with a rounded inner periphery 90.

A bipartite driven disc comprising parts 92 and 94 is situated adjacent driven disc 88. Similarly, a second bipartite driven disc is disposed adjacent the first driven disc. The parts of this second disc are designated by reference characters 96 and 98. A final driven disc 100 is disposed adjacent disc part 98. Each of the discs and disc parts is formed with a hub that is externally splined to establish a driving connection with the internal splines of drum 78. The adjacent peripheral portions of the disc parts and the disc 100 are disposed in abutting sealing relationship with respect to each other. They are held axially fast by a shoulder 102 formed on the periphery of plate 80. As the drum 78 is threadably received over the plate 80, shoulder 102 clamps together the driving discs and the driven disc parts.

The driving disc parts 56, 58, 60 and 62 are in the form of Belleville springs. Disc part 56 includes a rounded peripheral portion 104 that is disposed in juxtaposed relationship with respect to a corresponding peripheral portion 106 formed on adjacent disc part 58. Situated between the peripheral portions 104 and 106 is an annular sealing ring 108. The disc parts 56 and 58 and the sealing ring 108 cooperate to define a pressure cavity that is designated by reference character 110.

This pressure cavity 110 communicates with the splines on shaft portion 48 through a radial port 112 which is formed by means of adjacent radial grooves in the hubs of disc parts 56 and 58. The grooves in turn are adapted to receive fluid from a radial passage 114 which in turn communicates with a central passage 116 formed in shaft 44. Thus, fluid may be introduced into the cavity 110 by distributing pressurized fluid to passage 116 through passage 114, through the grooves formed by the splines of the shaft portion 48 and finally through radial passage 112.

The disc parts 60 and 62 are formed in a fashion similar to the construction of disc parts 56 and 58. They cooperate to define a pressure cavity 118 and they include a sealing ring 120 which is disposed between their rounded outer peripheries. The cavity 118 communicates with the axial passages formed by the splines of shaft part 48 through a radial port 122, the latter in turn being formed by radial grooves in the hubs of disc parts 60 and 62.

Disc parts 92 and 94 are formed with rounded inner peripheries as indicated at 124 and 126, respectively. A circular sealing ring 128 is situated between the peripheral portions 124 and 126. The outer margins of the disc parts 92 and 94 are grooved to provide a radial passage 130 that communicates with axial passages formed by the splines of drum 78.

Disc parts 96 and 98 are formed in a fashion similar to the construction of disc parts 92 and 94, and they cooperate with a sealing ring 132 to define a pressure cavity.

The pressure cavities defined by the disc parts 92 and 94 and by the disc parts 96 and 98 communicate with passages 134 formed in shoulder 102. These passages 134 communicate also with passages 136 which extend to the hub of plate 80. Axially extending passages 138 are formed in driven shaft 46. These passages 138 communicate with the radially inward extremities of passages 136.

Several series of carrier discs with conical profiles are provided for establishing a driving connection between the driving disc and a driven disc. One group of carrier discs is indicated by reference characters 140, 142 and 144. They are formed with splined openings in their respective hubs to facilitate a driving connection with externally splined planet discs supporting shafts 146. These shafts 146 are journaled within carrier disc bearing blocks 148 and 150. Several groups of carrier discs can be provided, preferably three in number. They may be moved radially by means of a suitable mechanical adjusting mechanism such as that shown in Skuba Patent No. 3,043,150. This radial motion is indicated in FIGURE 3 by means of a double arrow 152.

As indicated in FIGURE 3, the outer periphery of disc 140 is disposed between the outer peripheries of disc 52 and disc part 56. The outer peripheral extremity of the disc 140 is disposed between the inner peripheral margin of disc 88 and disc part 92.

In a similar fashion, discs 144 are disposed at their outer margins between the inner peripheries of disc 100 and disc part 98. Furthermore, discs 142 are situated between the margins of disc parts 94 and 96.

Discs 144 are situated also between driving disc 54 and disc part 62. Similarly, discs 142 are situated between disc parts 58 and 60.

When the planet disc assemblies are moved toward the axis of shaft 44, the disc parts 56, 58, 60 and 62 will tend to become compressed together and the pressure cavities 110 and 118 will become reduced in volume. At the same time, the disc parts 92, 94, 96 and 98 will move apart thereby increasing the volume of their respective pressure chambers. It will be observed, however, that the planet discs at all times will be radially aligned with the driving discs and the driven discs and the tilting action represented schematically in FIGURE 2 will not take place.

The clamping force that is obtained in this drive is somewhat ratio sensitive inherently by reason of the Belleville spring action of the disc parts. For example, the disc parts will provide a greater clamping force when they are compressed axially. The clamping force, however, can be controlled more accurately by introducing the desired fluid pressure into the pressure cavities defined by the disc parts. The pressure distribution to the cavities for the driving disc parts can be controlled separately from the pressure that is distributed to the driven disc parts since separate circuits are provided as previously described.

Having thus described a preferred embodiment of my invention, what I claim and desire to secure by U.S. Letters Patent is:

1. In a friction disc drive, a first disc comprising two juxtaposed parts, one periphery of each disc part being disposed in sealing relationship with respect to the corresponding periphery of the other disc part, a deformable sealing ring disposed between said one periphery of each of said first discs, said disc parts and said sealing ring cooperating to define in part a pressure chamber, a set of other discs frictionally contacting said one peripheries of said disc parts, said first disc being rotatably mounted for rotation about a first axis, said other discs being rotatably mounted for rotation about a second axis, and means for introducing fluid under pressure to said pressure chamber, and means for holding the inner peripheries of said driving disc parts axially fast whereby said outer peripheries are adapted to exert an axial clamping force upon introduction of pressure into said pressure chambers.

2. In a friction disc drive comprising driving discs and driving discs situated in coaxial relationship, each of said driving discs including juxtaposed parts, the outer peripheries of said disc parts having a deformable sealing ring disposed therebetween, said parts and said sealing ring cooperating to define pressure cavities, a series of intermediate carrier discs disposed in interdigital frictional driving relationship with respect to said driving discs and said driven discs, and means for introducing fluid under pressure to said pressure cavities, and means for holding the inner peripheries of said driving disc parts axially fast whereby said outer peripheries are adapted to shift axially upon introduction of pressure into said pressure cavities as said driving discs are flexed during radial movement of said carrier discs.

3. In a friction disc drive comprising driving discs and driven discs situated in coaxial relationship, each of said driving discs including juxtaposed parts the outer peripheries of said disc parts having a deformable sealing ring disposed therebetween, said parts and said sealing ring cooperating to define pressure cavities, a series of intermediate carrier discs disposed in interdigital frictional driving relationship with respect to said driving discs and said driven discs, means for introducing fluid under pressure to said pressure cavities, each of said driven discs being comprised in part by adjacent juxtaposed driven disc parts the inner peripheries of said driven disc parts having a deformable sealing ring disposed therebetween, said driven disc parts and said ring also cooperating to define pressure cavities, means for introducing fluid under pressure to said last-mentioned pressure cavities, said carrier discs each being formed with a generally conical shape having a peripheral axial dimension that is greater than the axial dimension of its hub portion, means for holding axially fast the inner peripheries of said driving disc parts and the outer peripheries of said driven disc parts whereby said driving and driven discs are adapted to be flexed upon radial adjustment of said carrier discs.

4. In a friction disc drive mechanism comprising driving discs and driven discs situated in coaxial relationship, each of said driving discs including juxtaposed parts, the outer peripheries of said disc parts having a deformable sealing ring disposed therebetween, said parts and said sealing ring cooperating to define a pressure cavity, a series of intermediate carrier discs disposed in interdigital frictional driving relationship with respect to said driving discs and said driven discs, means for introducing fluid under pressure to said pressure cavities, each of said driven discs being comprised in part by adjacent juxtaposed driven disc parts, the inner peripheries of said driven disc parts having a deformable sealing ring disposed therebetween, said driven disc parts and said sealing ring cooperating to define a pressure cavity, means for introducing fluid under pressure to said last-mentioned pressure cavities, said carrier discs each being formed with a generally conical shape having a peripheral axial dimension that is greater than the axial dimension of its hub portion, and means for holding axially fast the inner peripheries of said driving disc parts and the outer peripheries of said driven disc parts whereby said driving and driven discs are adapted to be flexed upon radial adjustment of said said carrier discs, said carrier discs being movable radially to adjust the speed ratio of said mechanism, the volume of the pressure cavity of said driving discs increasing and the volume of the pressure cavity of said driven discs decreasing as said carrier discs are moved radially outwardly.

5. In a friction disc drive comprising driving discs and driven discs situated in coaxial relationship, said driving discs including juxtaposed parts that cooperate to define pressure cavities, a series of intermediate carrier discs disposed in interdigital frictional driving relationship with respect to said driving discs and said driven discs, means for introducing fluid under pressure to said pressure cavities, said driven discs being comprised in part by adjacent juxtaposed driven disc parts that cooperate to define therebetween pressure cavities, means for introducing fluid under pressure to said last-mentioned pressure cavities, said carrier discs each being formed with a generally conical shape having a peripheral axial dimension that is greater than the axial dimension of its hub portion, said carrier disc being movable radially to adjust the speed ratio of said mechanism, the volume of the pressure cavity of said driving discs increasing and the volume of the pressure cavity of said driven discs decreasing as said carrier discs are moved radially outwardly, the peripheral portions of said driving discs and said driven discs that engage said carrier discs having received therein an annular sealing ring that cooperates with said disc parts to define their respective pressure cavities.

References Cited by the Examiner
UNITED STATES PATENTS 3,043,150  7/60  Skuba _____ 74—199
3,060,758  10/62  Kano _____ 74—199

DON A. WAITE, *Primary Examiner.*